United States Patent [19]

Hulsing, II et al.

[11] Patent Number: 4,672,752

[45] Date of Patent: Jun. 16, 1987

[54] METHOD OF DETERMINING THE DIFFERENCE IN BOREHOLE AZIMUTH AT SUCCESSIVE POINTS

[75] Inventors: Rand H. Hulsing, II, Redmond; Rex B. Peters, Woodinville; Kurt E. Steinke, Bellevue, all of Wash.

[73] Assignee: Sundstrand Data Control, Inc., Rockford, Ill.

[21] Appl. No.: 856,395

[22] Filed: Apr. 25, 1986

Related U.S. Application Data

[62] Division of Ser. No. 576,024, Feb. 1, 1984, Pat. No. 4,614,040, which is a division of Ser. No. 406,431, Aug. 9, 1982, Pat. No. 4,434,654.

[51] Int. Cl.⁴ ............................................. G01C 19/00
[52] U.S. Cl. ...................................... 33/302; 33/312; 73/151
[58] Field of Search ................. 33/304, 302, 312, 313; 73/151

[56] References Cited

U.S. PATENT DOCUMENTS

| | | |
|---|---|---|
| 3,571,937 | 3/1971 | Sears . |
| 3,896,412 | 7/1975 | Rohr ................................ 33/304 |
| 4,071,959 | 2/1978 | Russell et al. .................... 33/313 |
| 4,231,252 | 11/1980 | Cherkson . |
| 4,547,774 | 10/1985 | Gould . |

*Primary Examiner*—William D. Martin, Jr.
*Attorney, Agent, or Firm*—Wood, Dalton, Phillips, Mason & Rowe

[57] ABSTRACT

A borehole survey instrument has a probe with a polarized light system for transmitting a signal representing the angular orientation of the probe to the surface. Light from a source in the probe is directed through a polarized filter with an axis of polarization orthogonal to the longitudinal axis of the probe. The polarized light beam is transmitted to the surface through an optical fiber light conduit. The angle of polarization is detected with a rotating polarizing filter and provides a measure of the probe orientation. In surveying a borehole, azimuth is determined from inclinometer measurements. The probe orientation in vertical sections of the borehole is measured by the polarized light system. Two measures of borehole azimuth are combined, providing an improved measure of azimuth in boreholes near vertical and near horizontal.

2 Claims, 9 Drawing Figures

METHOD OF DETERMINING THE DIFFERENCE IN BOREHOLE AZIMUTH AT SUCCESSIVE POINTS

This is a division of application Ser. No. 576,024, filed Feb. 1, 1984, now U.S. Pat. No. 4,614,040, which is a division of application Ser. No. 406,413 filed Aug. 9, 1982, now U.S. Pat. No. 4,434,654.

This invention relates to a borehole survey instrument having an improved means for determining the rotational orientation of the borehole probe as it moves through a vertical borehole and to an improved method of determining borehole azimuth.

This application is related to Liu Ser. No. 200,096 filed Oct. 23, 1980 and Hulsing Ser. No. 224,789 filed Jan. 13, 1981, now U.S. Pat. No. 4,399,692. The disclosures of both applications are incorporated herein by reference.

A typical borehole survey instrument has a probe housing which is suspended from a cable and moved through the borehole. An inclinometer, for example an orthogonal triad of accelerometers, measures the angle of the local vertical with respect to the probe. The probe is free to rotate about its longitudinal axis as it moves through the borehole. It is necessary to measure the probe orientation to provide a reference for the inclinometer measurements, in order to determine the borehole azimuth. It is known to measure orientation with a gyroscope or a magnetometer. Both have operating limitations which impair their reliability, degrade accuracy and contribute to high cost.

The Liu and Hulsing applications disclose borehole survey instruments which use multi section probes together with means for determining the incremental azimuth changes as the probe moves through the borehole. These instruments eliminate the gyroscope or magnetometer but have other disadvantages, including a long probe dimension and an accumulation of measurement error which reduces accuracy of measurement.

The present instrument measures probe orientation directly using polarized electromagnetic radiation and transmits an orientation signal to the surface through a conduit which maintains the axis of polarization of the signal. The instrument is particularly useful in providing a measure of probe orientation as the probe traverses a vertical borehole section where orientation cannot be measured with an inclinometer.

A feature of the invention is an improved and simplified method for determining borehole azimuth from successive inclinometer measurements.

Further features and advantages of the invention will readily be apparent from the following specification and from the drawings, in which.

Figure 1:
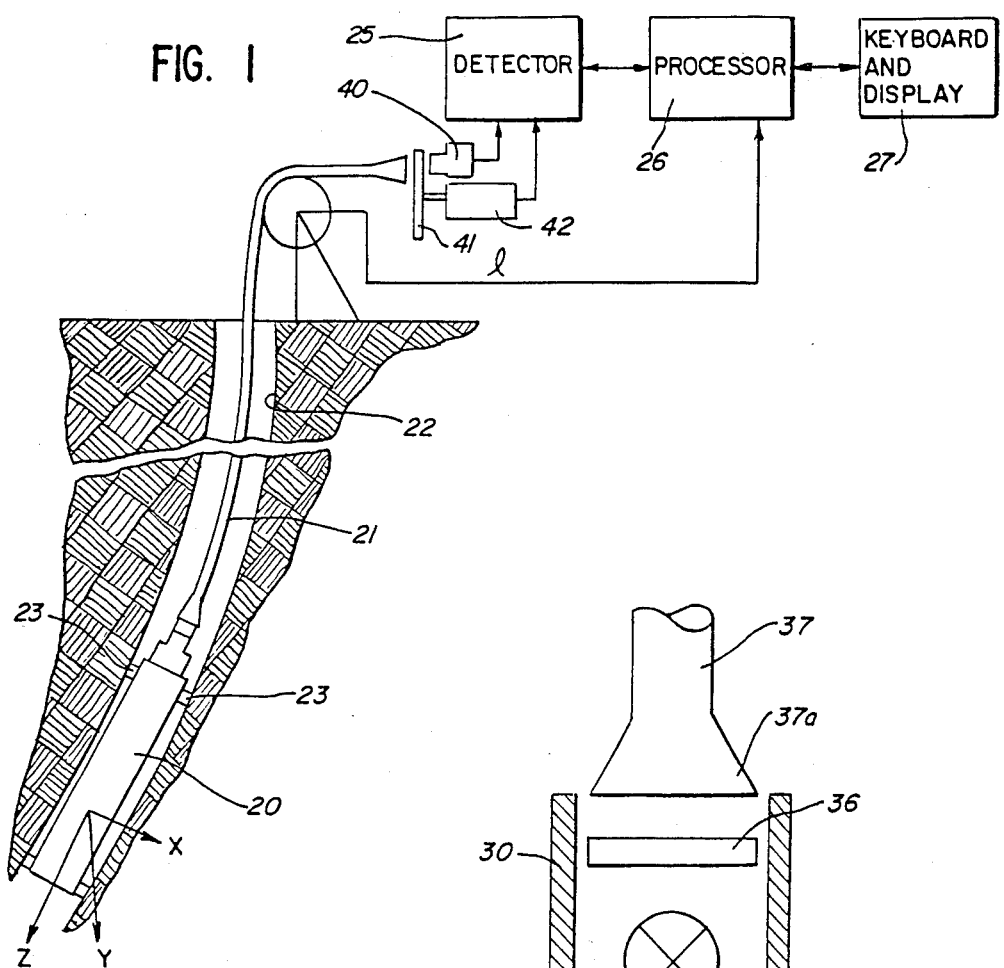
FIG. 1 is a diagram of an apparatus embodying the invention, including a section through the borehole showing the probe.

In the survey system of FIG. 1, a probe 20 is suspended from a cable 21 for movement through a borehole 22. The probe 20 is centered within the borehole by suitable spacers 23 so that the longitudinal axis of the probe is centered in the borehole and may be considered coincident with the borehole axis. Probe 20 is free to rotate as it moves through the borehole. Cable 21 passes over a rotating wheel which provides a measure l of the distance of the probe downhole. A cable hoisting mechanism for lowering and raising probe 20 is not shown to avoid complicating the drawing.

Briefly, probe 20 includes means for measuring the inclination of the borehole with respect to the vertical or gravity vector at successive points along the borehole. As will appear, this measurement in a slant borehole provides sufficient information for a determination of the change in borehole azimuth from point to point. Many boreholes have a vertical section, particularly the initial section below the surface. Orientation of the probe in a vertical borehole is measured using the polarized light system described below. Signals representing inclination and orientation of the probe are transmitted to the surface through cable 21 and coupled to a detector 25. The output of the detector is in turn coupled with a data processor 26 connected with a keyboard and display 27 used to input data to and derive information from the system.

Figure 2:
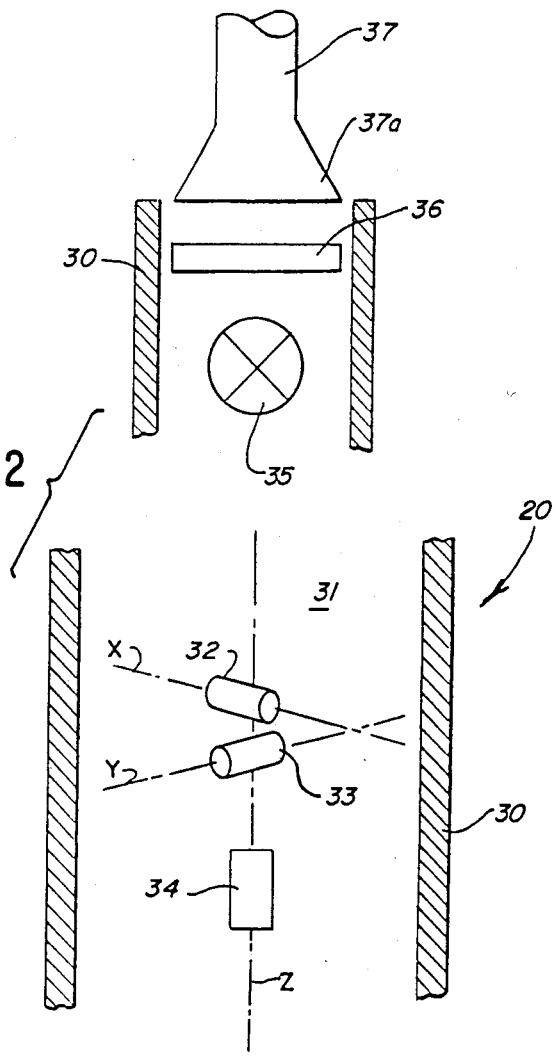
FIG. 2 is a fragmentary diagrammatic illustration of the probe showing the polarized light source and inclinometer.

The elements of the probe relevant to the invention are illustrated schematically in FIG. 2. The probe has a housing 30 in which is located an inclinometer 31 which is preferably made up of an orthogonal triad of accelerometers 32, 33, 34 with their sensitive axes designed X, Y, Z, respectively. The Z axis is shown as coincident with the longitudinal axis of the probe. The X and Y axes define a plane at right angles to the Z axis. The accelerometers which measure the local gravity vector are preferably servoed devices. Signals from the accelerometers define the inclination angle of the borehole from the vertical and in a slant hole the rotation angle of the probe with respect to a vertical plane through the probe axis. Two accelerometers or other angular relationships could be used, but the illustrated inclinometer is preferred.

A light source 35, as a light emitting diode, is located at the upper end of the probe 20. A polarizing filter 36 is fixed in housing 30 to polarize the light from source 35 along an axis transverse to the longitudinal axis of the probe. An optical fiber light conduit 37 receives polarized light from filter 36 and conducts it to the surface. Optical fiber conduit 37 may be incorporated in hoisting cable 31. The end 37a of the optical fiber light conduit is preferably fixed to the end of probe housing 30. If, however, rotation of probe 20 as it moves through the borehole causes excessive twisting of cable 21, the cable and optical fiber light conduit 37 can be connected with the probe housing 37 through a swivel joint (not shown).

As probe 20 rotates about its axis, the plane of polarization of the light from LED 35 rotates with the probe. The plane of polarization established by filter 36 is not substantially modified either by reflection of the light as it passes through the fiber optic light conduit 37 or by twisting of cable 21 and the light conduit. Accordingly, the axis of polarization of the light detected at the surface represents the orientation of the probe about its longitudinal axis.

The polarized light received at the surface through optical fiber light conduit 37 is directed to a light sensor 40 which is connected with detector 25. Interposed between the optical fiber light conduit and sensor 40 is a second polarizing filter 41 which is rotated by a motor 42.

Figure 3:
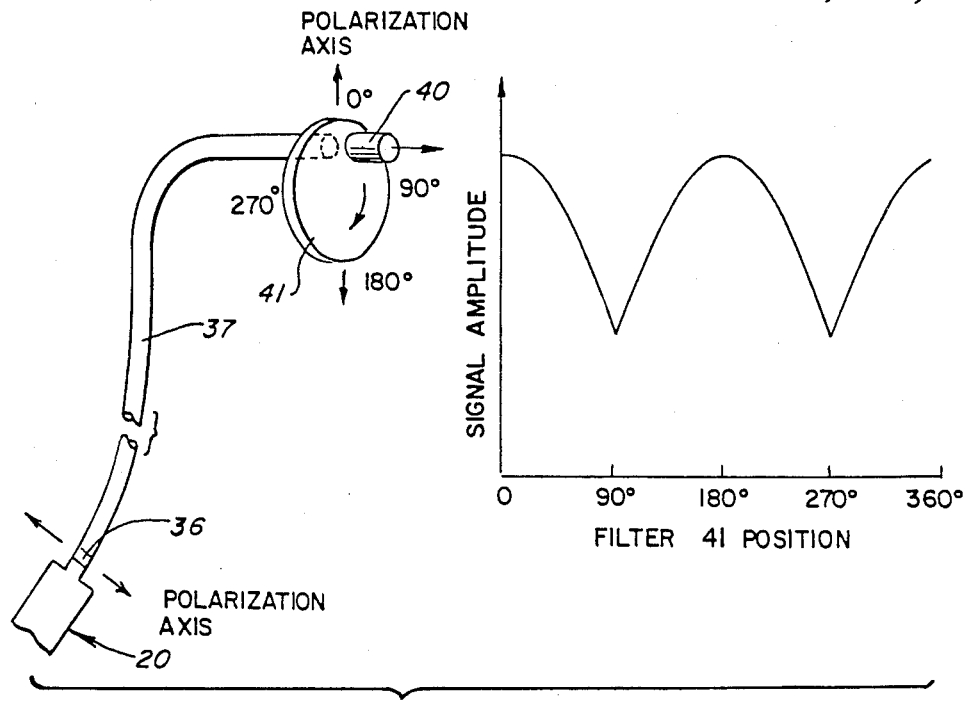
FIGS. 3 and 4 are diagrammatic illustrations of the detection of the angular orientation of the probe.
Figure 4:
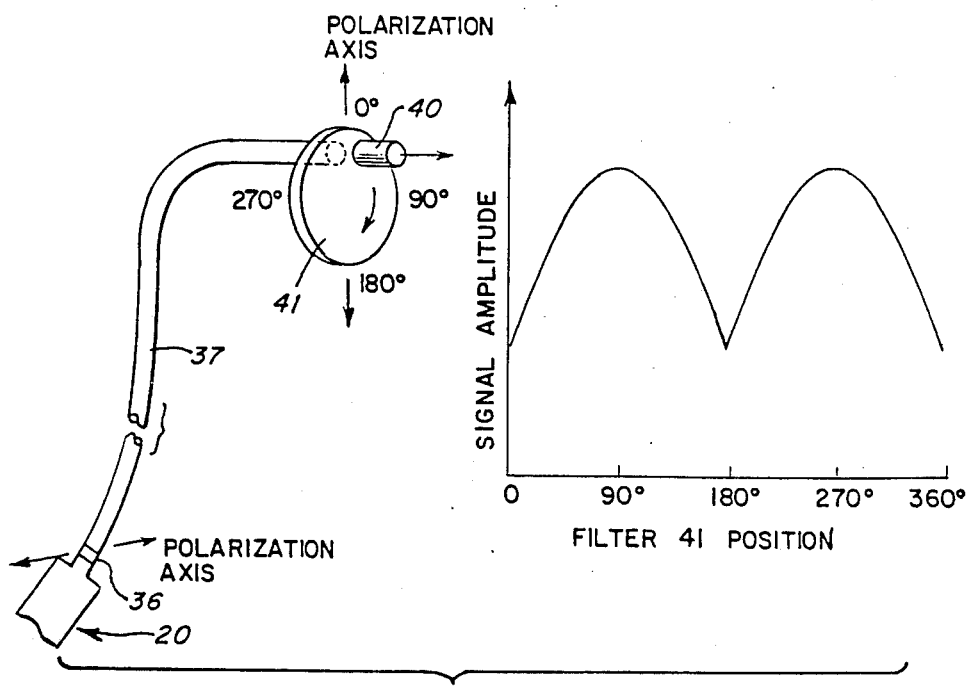

The determination of the probe orientation from the polarized light is illustrated in FIGS. 3 and 4. As filter 41 rotates, the light received by sensor 40 is a maximum when the polarization axis of the filters are coincident and a minimum when the axes are 90° displaced. The curves in FIGS. 3 and 4 plot the received light or sensor signal amplitude as a function of the angular position of filter 41. In FIG. 3 the polarization axis of filter 36 is aligned with that of filter 41 at the 0° position. Signal maximums occur at 0° and 180°. Signal minimums occur with filter 41 at 90° and 270°. In FIG. 4, probe 20 is displaced 90° from its rotational position in FIG. 3. With filter disc 41 at the 0° position, the signal amplitude is minimum and this condition is repeated with the filter disc at 180°. Signal maximums occur at 90° and 270°.

In surveying a borehole, the probe 20 is oriented to a known azimuth reference at the top of borehole 22. The angular relation between the output of sensor 40 and rotating filter 41 is noted. As the probe moves through the borehole rotational orientation of the probe is correlated with the distance 1 of the probe along the borehole. It is necessary only that the angular velocity of the rotating filter 41 be much greater than the angular velocity of the probe 20.

Signals representing the output of sensor 40 and the angular position of filter disc 41 are coupled with detector 25 which measures the phase angle of the signal with respect to the angular position of filter 41 and determines the rotational position of probe 20. The relative difference between signal peaks and nulls may vary with system conditions, but the phase angle does not. The signal is basically a half-wave rectified sine curve with a DC bias. Detector 25 may, for example, incorporate a data processor which applies a Fourier curve fit to the detector signal. The fundamental frequency component of the signal is twice that of the wheel rotation. Variable terms in the Fourier representation of the signal can be ignored. The phase angle of the signal uniquely identifies probe orientation.

Figure 5:
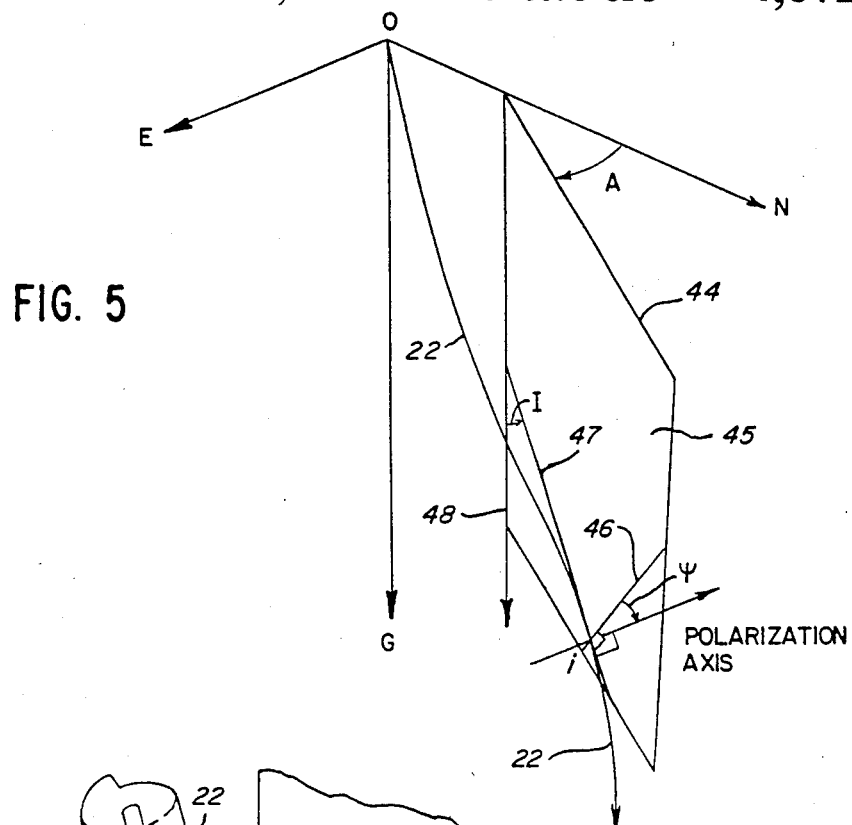
FIGS. 5-7 are geometric diagrams used in describing the determination of borehole azimuth.
Figure 6:
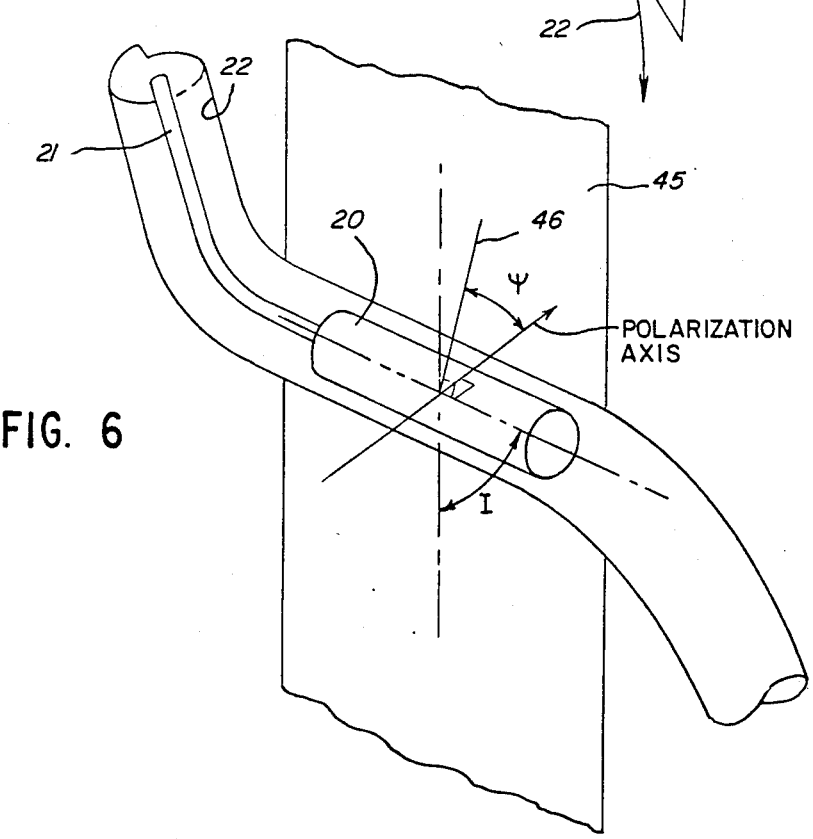

The determination of the downhole position of the probe from the signals representing orientation of the probe about its longitudinal axis, distance downhole and the orientation of the probe with respect to gravity (i.e., the vertical component of earth's gravitational force) from inclinometer 31 will be described in connection with FIGS. 5, 6 and 7. In FIG. 5, borehole 22 is depicted extending downwardly from the surface of the earth. A three-dimensional coordinate system, N (north), E (east), G (gravity) has its origin at the intersection of the borehole with the surface. The local surface area may be considered planar. With the probe 20 located at a point i inclinometer 31 measures the angle $\psi$ between the transverse reference axis of the probe, i.e., the axis of polarization of filter 36, and the vertical plane 45 which contains the longitudinal axis of the probe. The angle $\psi$ is indicated between the polarization axis of filter 36 (sometimes referred to as the transverse reference axis of the probe) and a line 46 normal to the longitudinal axis of the probe and lying in vertical plane 45.

The inclination angle I of the probe and borehole at point i is shown as the angle between an extension of the longitudinal axis 47 of the probe and the vertical line 48 in plane 45.

The intersection of vertical plane 45 with the surface of the earth defines a line 49 the orientation of which is the azimuth of the borehole at point i. The azimuth angle A is measured clockwise from north, looking down on the surface of the earth.

The inclination angle I is calculated from the accelerometer signals of inclinometer 31. Similarly, at any point where the borehole axis is not vertical, the angle $\psi$ is calculated from the accelerometer signals. Where, however, the borehole axis is vertical, there is no unique vertical plane and the angle $\psi$ not defined. A typical borehole has an initial vertical section and it is in traversing such a vertical section that the polarized light rotational orientation detector is used. As described above, at the start of a survey operation, the probe orientation and the phase angle of the polarized light signal are noted. Changes in the rotational orientation of the probe as it is lowered through a vertical borehole section are recorded. When the probe leaves the vertical borehole section, its orientation is known and provides the basis for further determination of borehole azimuth.

It was pointed out above that the angle $\psi$ is determined from the accelerometer signals. In the Liu application identified above, there is a disclosure that the angle $\psi$ and borehole azimuth are related. The relationship is implicitly involved in a series of matrix operations by which Liu derives a representation of the borehole trajectory. An explicit expression of the relationship is the basis of the method of determining borehole azimuth in accordance with the present invention.

Figure 7:
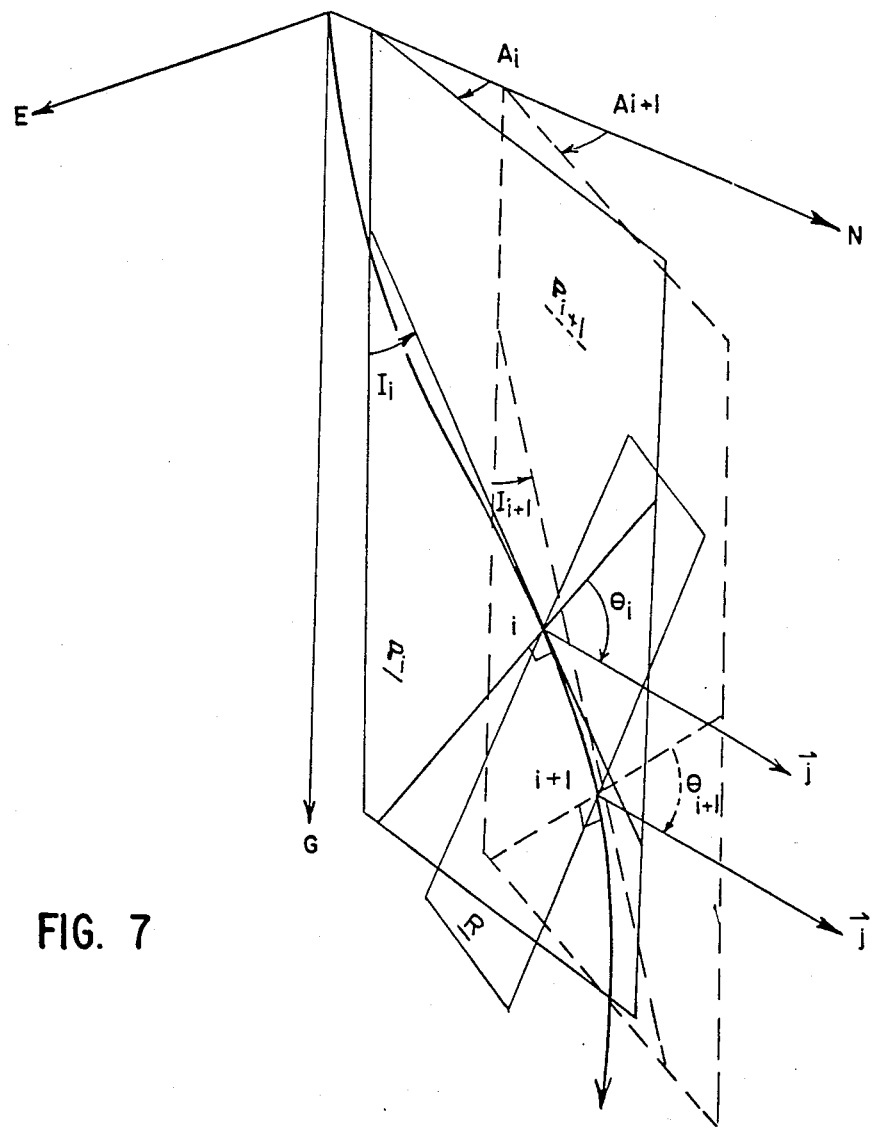

In FIG. 7, two successive borehole points i and i+1 are shown and it is assumed that the borehole section between the two points is a plane curve. This is not always true in a borehole but is a resonable approximation and may be made as accurate as desired by selecting very small distances between points. The plane $P_i$ is a vertical plane containing the longitudinal axis of the probe at the point i. Plane $P_i$ has an azimuth angle $A_i$ and the inclination of the probe at point i is $I_i$. Plane $P_{i+1}$ is a vertical plane containing the longitudinal probe axis at point i+1. The plane R contains the plane borehole curve from point i to point i+1.

The vector $\vec{j}$ is a unit vector in the probe coordinate system, initially aligned with the E axis of the global coordinate system. It can be shown using the method of Euler angles that the components of the unit vector $\vec{j}$ in the global coordinate system are:

N = −cos A cos I sin $\psi$ − sin A cos $\psi$

E = −sin A cos I sin $\psi$ + cos A cos $\psi$

G = sin I sin $\psi$

In FIG. 7, the unit vector $\vec{j}$ is shown at both points i and i+1, rotated through an angle $\theta$ from the respective vertical planes $P_i$ and $P_{i+1}$ so that the vectors are perpendicular to the plane of the borehole curve at both points. The two units vectors will then have the same direction and thus the same components in the NEG coordinate system. Therefore, $$N = -\cos A_i \cos I_i \sin \theta_i - \sin A_i \cos \theta_i =$$

-continued $$-\cos A_{i+1}\cos I_{i+1}\sin\theta_{i+1} - \sin A_{i+1}\cos\theta_{i+1}$$

$$E = -\sin A_i \cos I_i \sin\theta_i + \cos A_i \cos\theta_i =$$

$$\sin A_{i+1}\cos I_{i+1}\sin\theta_{i+1} + \cos A_{i+1}\cos\theta_{i+1}$$

$$G = \sin I_i \sin\theta_i = \sin I_{i+1}\sin\theta_{i+1}$$

The change of azimuth angle from point i to i+1 may be expressed as $$\Delta_i = A_{i+1} - A_i$$

By linear combination of the N and E equations, two new equations may be derived in terms of $\Delta_i$, $$\cos\Delta_i \cos I_i \sin\theta_i - \sin\Delta_i \cos\theta_i =$$

$$\cos I_{i+1}\sin\theta_{i+1}$$

$$\sin\Delta_i \cos I_i \sin\theta_i + \cos\Delta_i \cos\theta_i = \cos\theta_{i+1}$$

An angle $\gamma_i$ is defined as $$\gamma_i = \psi_{i+1} - \psi_i = \theta_{i+1} - \theta_i$$

The equations above may be combined with the equation for the G components of the unit vector, $$[\cos I_i \sin I_{i+1}\sin\gamma_i]\cos\Delta_i -$$

$$[\sin I_i - \sin I_{i+1}\cos\gamma_i]\sin\Delta_i =$$

$$\sin I_i \cos I_{i+1}\sin\gamma_i$$

$$[\sin I_i - \sin I_{i+1}\cos\gamma_i]\cos\Delta_i +$$

$$[\cos I_i \sin I_{i+1}\sin\gamma_i]\sin\Delta_i =$$

$$\sin I_i \cos\gamma_i - \sin I_{i+1}$$

Solving these equations for $\sin \Delta_i$ and $\cos \Delta_i$ and dividing one by the other to get $\tan \Delta_i$, the following relationship is derived:

$$\Delta_i = A_{i+1} - A_i = \tan^{-1}\left[\frac{(\cos I_i + \cos I_{i+1})\sin\gamma_i}{\sin I_i \sin I_{i+1} - (1 + \cos I_i \cos I_{i+1})\cos\gamma_i}\right]$$

Thus, the change in azimuth angle between successive points of the borehole may be determined from the inclinometer measurements at the two points.

As pointed out above, the orientation of probe 20 is measured directly at the earth's surface. The probe is then lowered through the borehole. So long as the borehole axis is vertical, the probe orientation about its longitudinal axis is measured utilizing the polarized light system. At the point the borehole deviates from the vertical, changes in azimuth are determined by successive computations of $\Delta_i$ and the azimuth angle at any point determined by adding the azimuth angle increments. Should the probe encounter another vertical borehole section, the orientation of the probe about its longitudinal axis as it passes through the vertical section is monitored by the polarized light system.

If an additional assumption is made that the borehole curve between points is smooth and if the points are selected to be very close together so that $\psi_i - \psi_{i+1}$ is a small angle, and $$I_i \cong I_{i+1},$$

then $$\Delta_i \cong \frac{\psi_i - \psi_{i+1}}{\cos I_i}$$

This relationship is useful in visualizing behavior of the survey system and is sufficiently accurate for actual surveying in some applications.

The apparatus which has been described is simpler than that of the Liu application in that it utilizes only one inclinometer rather than two and the probe is a single compact housing rather than two housings joined by a connection which is flexible to bend along the axis of the borehole but which resists rotation between the housings about the borehole axis. These are significant differences from a mechanical standpoint. However, a more important difference in the present borehole survey instrument and method is in the nature of the derivation of the borehole azimuth. In the prior Liu and Hulsing systems measurement errors are cumulative so that the accuracy of the measurements diminishes as more measurements are made. In the present system, there is a cancellation of errors so that the error in any azimuth measurement is a function of the difference between the initial azimuth and the final measure. Tens of thousands of measurements may be made in surveying a borehole so that the difference in accuracy of the two systems is significant.

Another important difference is that the accuracy of the Liu and prior Hulsing systems diminishes in vertical or near-vertical boreholes. In the present system, the initial azimuth measurement may be made quite accurate and the polarized light system for measuring probe rotation minimizes errors introduced while the probe traverses a vertical borehole.

Figure 8:
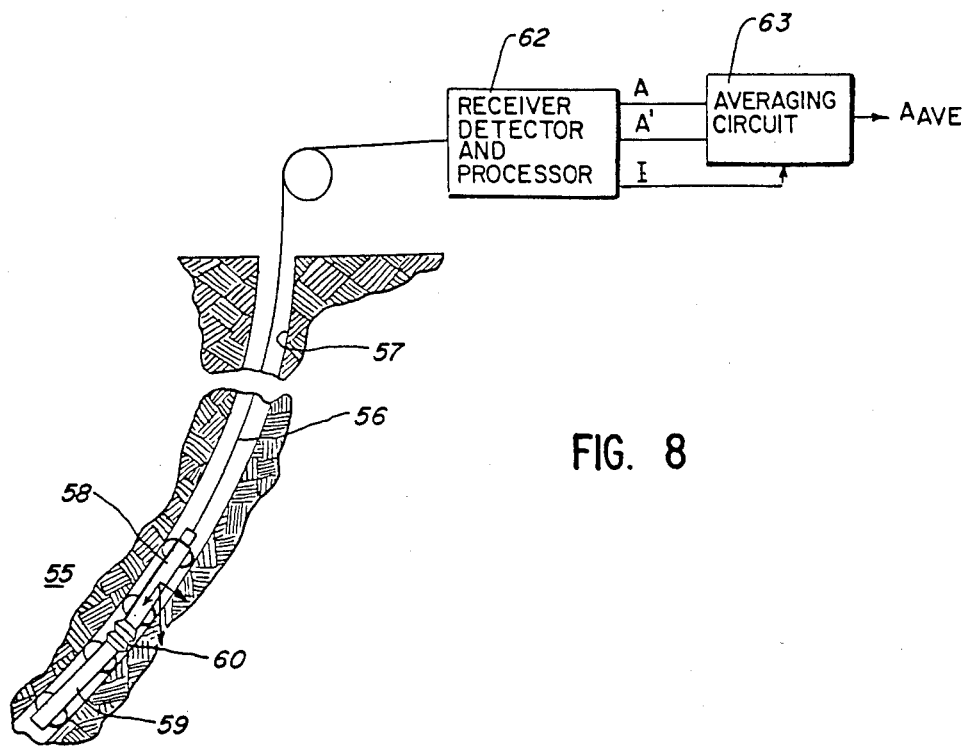
FIG. 8 is a diagram of a borehole survey apparatus with means for deriving and combining two measures of borehole azimuth.

The accuracy of the present system diminishes, however, as the borehole approaches the horizontal where cos I goes to zero. If a borehole with a horizontal section is to be surveyed, the instrument of FIG. 1 is combined with the instrument of Hulsing 4,399,629, as shown in FIG. 8. Here, probe 55 is suspended from cable 56 in borehole 57. Probe 55 has two sections 58, 59 connected by a flexible joint 60 of the character described in 4,399,629. Upper probe section 58 houses an inclinometer and a polarized light source as in FIG. 2. Flexible joint 60 is provided with means for generating signals representing the angle between the two probe sections. The various signals are transmitted to the surface through cable 56 and are coupled with receiver, detector and processor, block 62. The polarized light system and inclinometer signals are processed to develop a first measure of azimuth A which has a high degree of accuracy in a vertical borehole. Signals from the inclinometer and from joint 60 are processed to develop a second measure of azimuth A' which has a high degree of accuracy in a horizontal borehole and a lesser degree of accuracy in a vertical borehole. The azimuth signals A and A' are combined in averaging circuit 63 in accordance with the probe inclination I to produce a composite azimuth signal $A_{ave}$ where $$A_{ave} = A \cos I + A'(1 - \cos I)$$

Figure 9:
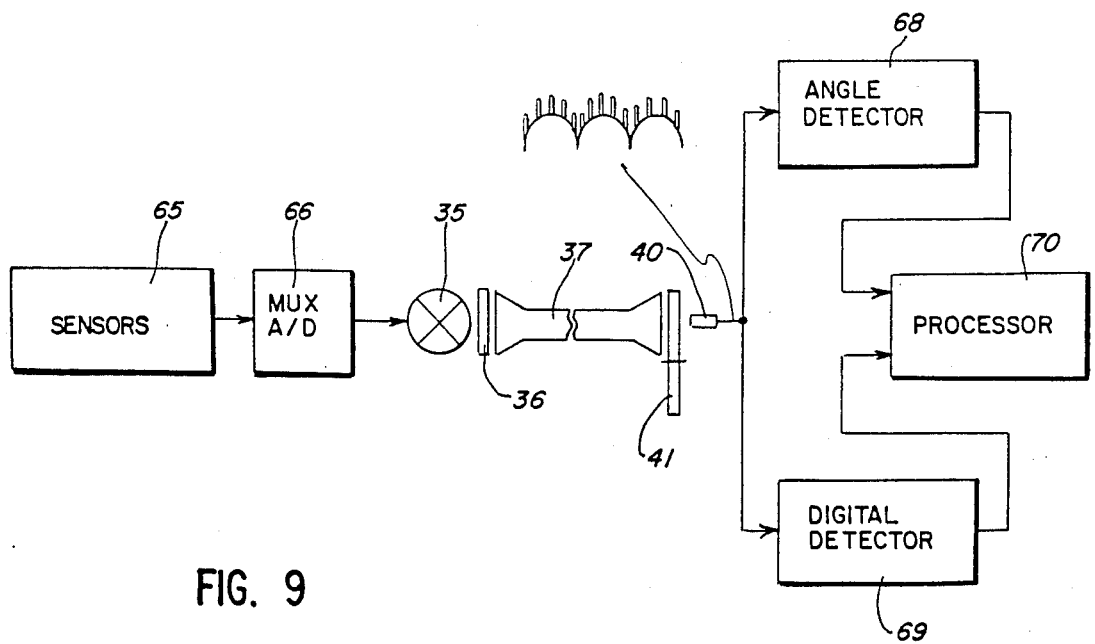
FIG. 9 is a block diagram of a system for transmitting sensor information to the surface through amplitude modulation of the polarized light beam.

Signals from the various sensors in the probe are preferably transmitted to the surface in digital form by amplitude modulation of the polarized light beam. The system for accomplishing this is illustrated in block form in FIG. 9. The various sensors, e.g., accelerometers 32, 33 and 34 and the angle sensors of joint 60, FIG. 8, are represented at block 65. The outputs of the sensors are selected individually by a multiplexer and converted from analog to digital form at block 66. The serial digital signals are coupled to lamp 35 and modulate the intensity of the light beam. The signal from light sensor 40 has the waveform illustrated at 67 although in practice the repetition rate of the digital signals may be many times that illustrated. The signal from light sensor 40 is connected with both the probe angle detector 68 and a digital signal detector 69. The outputs of the detectors are connected with processor 70. If the relative amplitudes of the rectified sine wave and the digital pulses are such that the digital signals are lost at the null of the analog signal, the digital data may be read only at the peaks of the sine waves. In this situation the digital signals representing each sensor output may be repeated to avoid loss of sensor information.

We claim:

1. The method of determining the difference between the borehole azimuth angles at successive points along the borehole which comprises:

passing a probe with an inclinometer through the borehole;

measuring the inclination angle between the vertical component of earth's gravitational force and the borehole axis at each of said successive points;

measuring the angle between the vertical component of earth's gravitational force and a probe reference axis, transverse to the borehole axis, at each of said successive points; and calculating the difference in borehole azimuth between successive points from the two angular measurements at one point and the two angular measurements at the next point.

2. The method of claim 1 for determining the difference $\Delta_i$ in borehole azimuth between successive points i and i+1 along the borehole, in which $\Delta_i$ is given by the expression $$\Delta_i = \tan^{-1} \left[ \frac{(\cos I_i + \cos I_{i+1})\sin\gamma_i}{\sin I_i \sin I_{i+1} - (1 + \cos I_i \cos I_{i+1})\cos\gamma_i} \right]$$

where $I_i$ is the inclination angle of the borehole axis at point i;

$I_{i+1}$ is the inclination angle of the borehole axis at point i+1;

$\gamma_i = \psi_{i+1} - \psi_i$;

$\psi_i$ is the angle between the gravity and the probe reference axis at point i; and $\psi_{i+1}$ is the angle between gravity and the probe reference axis at point i+1.

* * * * *